United States Patent [19]
Gardner

[11] 3,948,616
[45] Apr. 6, 1976

[54] APPARATUS FOR PIN INSERTION AND METHOD

[75] Inventor: George J. Gardner, Pinellas Park, Fla.

[73] Assignee: Tangen Drives, Inc., Clearwater, Fla.

[22] Filed: July 24, 1974

[21] Appl. No.: 491,508

[52] U.S. Cl................. 29/429; 29/208 R; 10/155 A
[51] Int. Cl.².................... B23P 15/00; B23P 19/08
[58] Field of Search.............. 29/429, 208 R, 200 R; 10/155 A, 155 R

[56] References Cited
UNITED STATES PATENTS

| | | | |
|---|---|---|---|
| 1,958,180 | 5/1934 | Brackett | 10/155 A |
| 2,271,028 | 1/1942 | Olson | 10/155 A |
| 2,284,698 | 6/1942 | Trotter | 29/208 R |
| 2,333,940 | 11/1943 | Kuehlman | 10/155 A |
| 2,714,214 | 8/1955 | Stern | 10/155 A |
| 2,927,333 | 3/1960 | Stern | 10/155 A |
| 3,523,316 | 8/1970 | Alexander | 10/155 A |
| 3,750,206 | 8/1973 | Pomernacki | 10/155 A |

FOREIGN PATENTS OR APPLICATIONS

| | | | |
|---|---|---|---|
| 549,478 | 11/1957 | Canada | 10/155 A |

Primary Examiner—C. W. Lanham
Assistant Examiner—Dan C. Crane

[57] ABSTRACT

A feeding and assembling mechanism for blanks having a bore and a pin for insertion into the bore comprising a feed means for the blank, and a feeding means for the pin, the discharge of the pin feeding means being above the discharge for the blank feeding means. Mechanism is provided to guide the pins downwardly oriented in a vertical access into a bore in the blank, and the blanks are thereafter rotated ninety degrees until the pin is on a horizontal axis. Supporting structure is then provided to support those blanks into which a pin has been inserted, and yet drop through an escapement those blanks which do not have a pin inserted. Recycling means for both the pins and blanks are provided, one form of which being a gravity recycle back into the feeder means. Specifically as shown, a double track vibratory feed or alternatively a pair of vibratory feeders are employed. The method contemplates the steps of vertical orientation of the pin, and thereafter horizontal orientation for purposes of recycling the blanks which do not have a pin.

11 Claims, 9 Drawing Figures

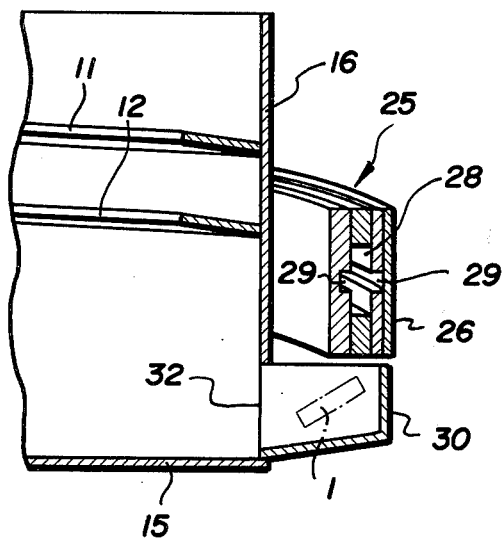
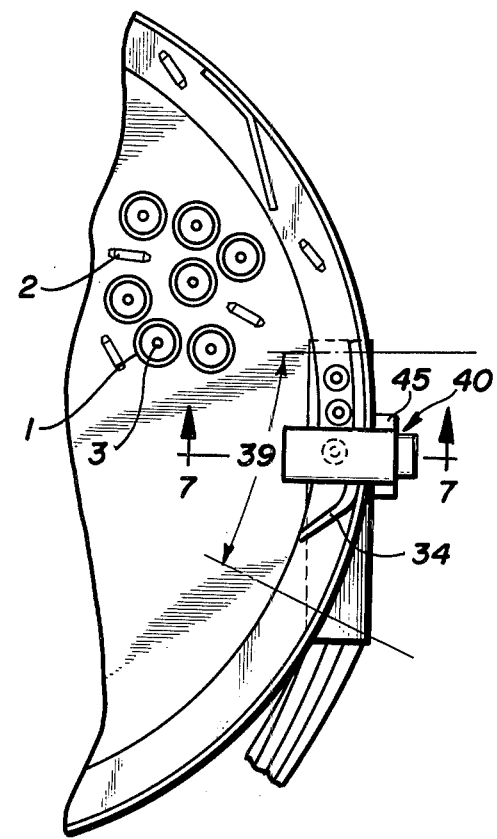
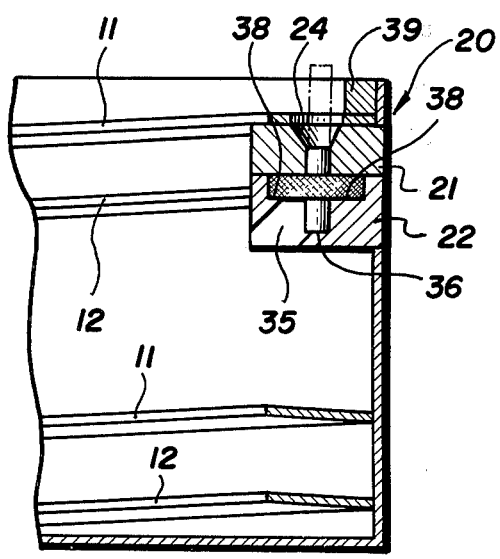
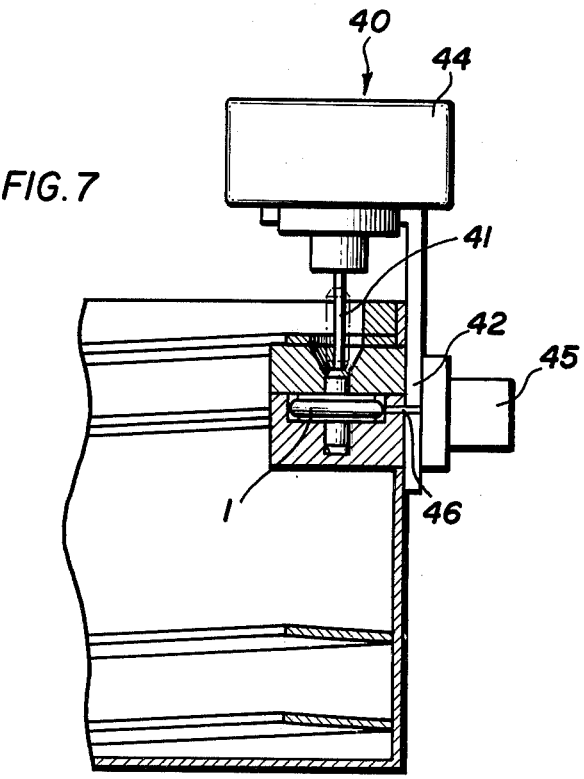

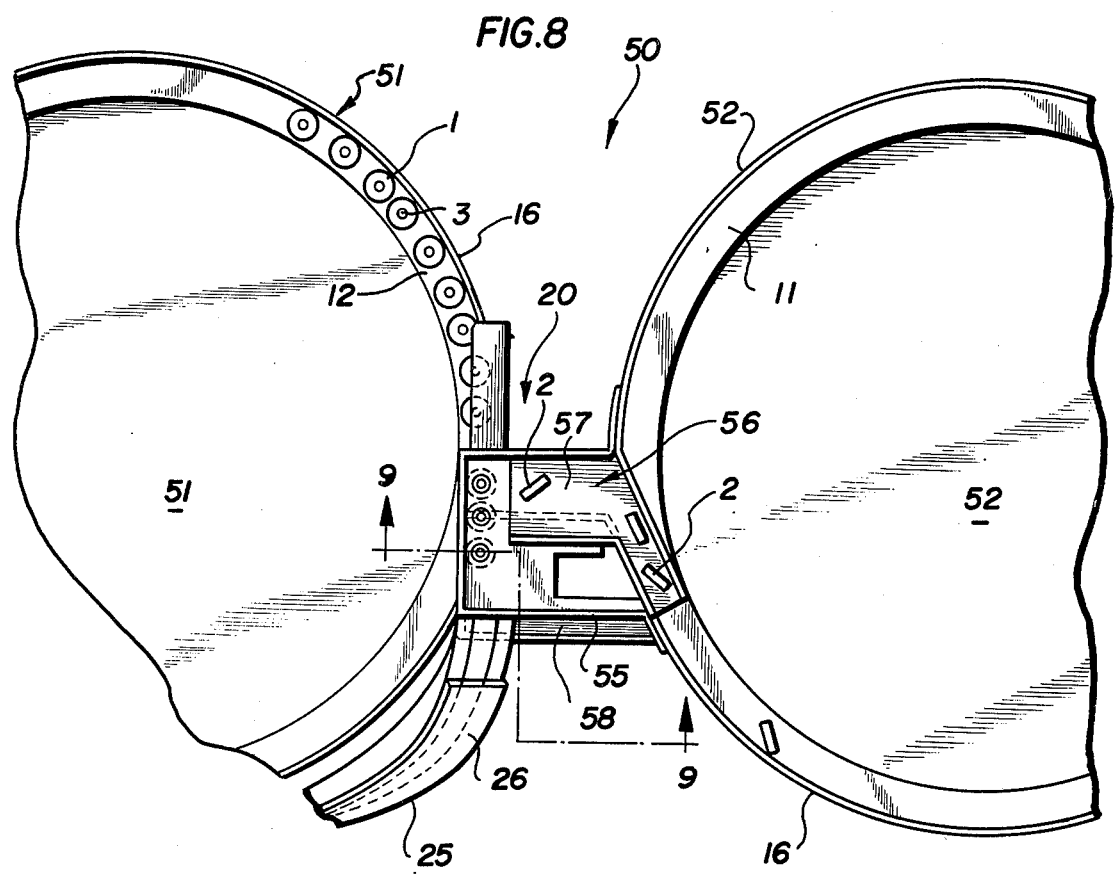
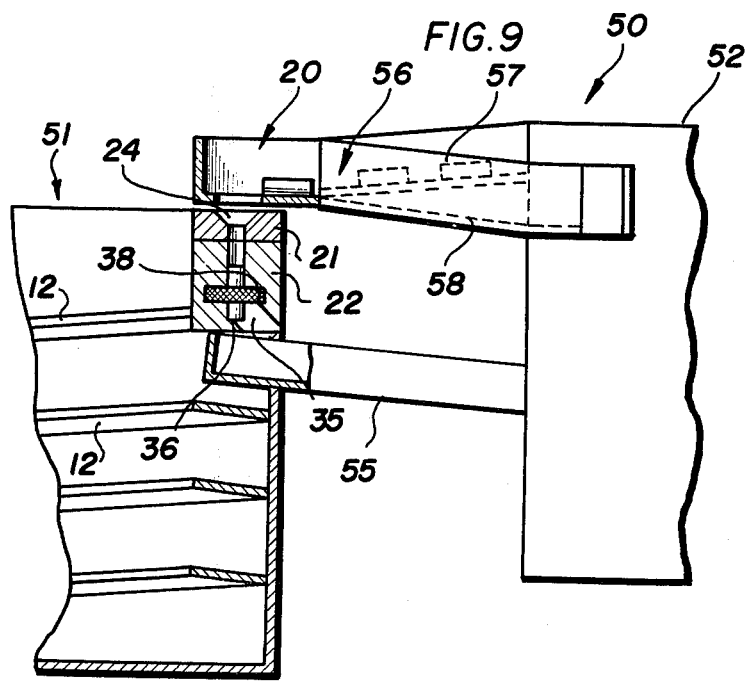

APPARATUS FOR PIN INSERTION AND METHOD

BACKGROUND OF INVENTION

1. Field of the Invention

The present invention relates to the general art of automation, and more particularly feeding, orienting, and assembling parts. Specifically, the structure and method are directed to positioning a pin in a blank, the blank having a bore adapted to receive the pin in snug fit relationship. While various feeder mechanisms can be employed, in this instance the field relates to vibratory feeders of the type disclosed in U.S. patents Balsiger U.S. Pat. No. 2,609,914 and Devol U.S. Pat. No. 2,464,216.

DESCRIPTION OF THE PRIOR ART

The known activity in this field relates, of course, to the subject matter set forth above as to vibratory feeders, and other feeders which are well known which may be of the tumbling barrel-type, cascade-type, or rotary cone-type. Where pins are inserted, quite often a "pick and place" device may be employed. The chief drawback of pick and place devices is a relatively low speed. Furthermore, most pick and place devices are sensitive to jams and misfeeds. A provision for removing either the blank having a bore, or the pin, prove complex and often involve electronic circuits which are expensive.

SUMMARY

The present invention stems from the discovery that in feeding pins for assembling into a blank having a bore to receive the pins, the pins should be fed vertically and above the blank, the pin being confined to descend in a vertical axis into the borehole in the blank, coupled with means for recycling those pins which do not enter the bore in the blank. Further, the invention contemplates the subsequent reorientation of the blank and pins so that the blanks having assembled pins are turned approximately 90° so that the pins are then horizontally mounted, and supported as they pass over an escapement in the track, the escapement dropping those blanks for recycling which do not have an assembled pin. Desirably, a vibratory feeder, or nonvibratory feeder means with a vibrator assist are employed so that the pin assembling into the blank can be the subject of rather wide tolerances, and the parts will flow with a minimum of gravitational assist with the exception of the dropping of the pins into the blank bore. The method particularly contemplates the vertical drop of the pin into the blank, and thereafter the ninety degree rotation of the blank for purposes of rejecting those blanks into which a pin has not been inserted. Two vibratory feeders have been shown, as an alternative embodiment to the preferred single vibratory feeder with two tracks, the lower track for the blanks and the upper track for the pins. In addition, a separate feeder for the pins operating on a different principal such as air assist, or centrifugal-type feeding, may be employed.

In view of the foregoing, it is one of the principal objects of the present invention to provide mechanism and method for feeding and assembling pins into a blank having a bore which is efficient in operation, economical to construct, and preferably automatic in its inspection and recycling of rejected unassembled parts.

Still another object of the present invention is to provide a mechanism for feeding, orienting, and positioning a pin within a blank in which no force fitting of the pin into the blank is employed, thereby accommodating substantial tolerances in the mechanism itself, as well as the two parts.

Still another object of the present invention is to provide a mechanism and method for feeding and assembling pins into a blank in which the reject rate is 10 per cent or less, and the recycling automatic of the paired parts which have not been assembled.

DESCRIPTION OF ILLUSTRATIVE DRAWINGS

Further objects and advantages of the present invention will become apparent as the following description of an illustrative embodiment proceeds, taken in conjunction with the accompanying drawings in which:

FIG. 4 is an enlarged, partially broken sectioned view of the feeder of FIG. 1 taken along the section line 4—4 of FIG. 1.

FIG. 5 is a top view, partially broken, taken of the assembly block at the 3 o'clock position of FIG. 1.

FIG. 6 is a further enlarged transverse sectional view of the assembly block taken along section line 6—6 of FIG. 1.

FIG. 7 is an enlarged transverse sectional view of the feeder block and pin press station taken generally along section line 7—7 of FIG. 5.

FIG. 8 is a top view of an alternative embodiment showing two feeders positioned in a substantially tangential relationship.

FIG. 9 is an enlarged transverse sectional broken view of the assembly block of the alternative embodiment feeder taken along section line 9—9 of FIG. 8.

DESCRIPTION OF PREFERRED EMBODIMENT

The subject feeder mechanism will be best understood by first referring to the parts which are being fed and assembled. In this instance, a circular blank 1, having a bore 3, is fed and oriented for insertion by a pin 2. In this particular instance, the blank 1 is a ratcheted wheel intended for use in a throw-away cigarette lighter for abrading the flint. The pin 2, of course, becomes the axle for the ratchet wheel in the assembled configuration. While it has been shown as a circular blank 1, it will be appreciated that various blanks of square or rectangular configuration may also be employed. Additionally, the pin 2 has been shown as a loose fit, but also contemplated is a tapered pin which will be fed into position for a press fit.

Figure 1:
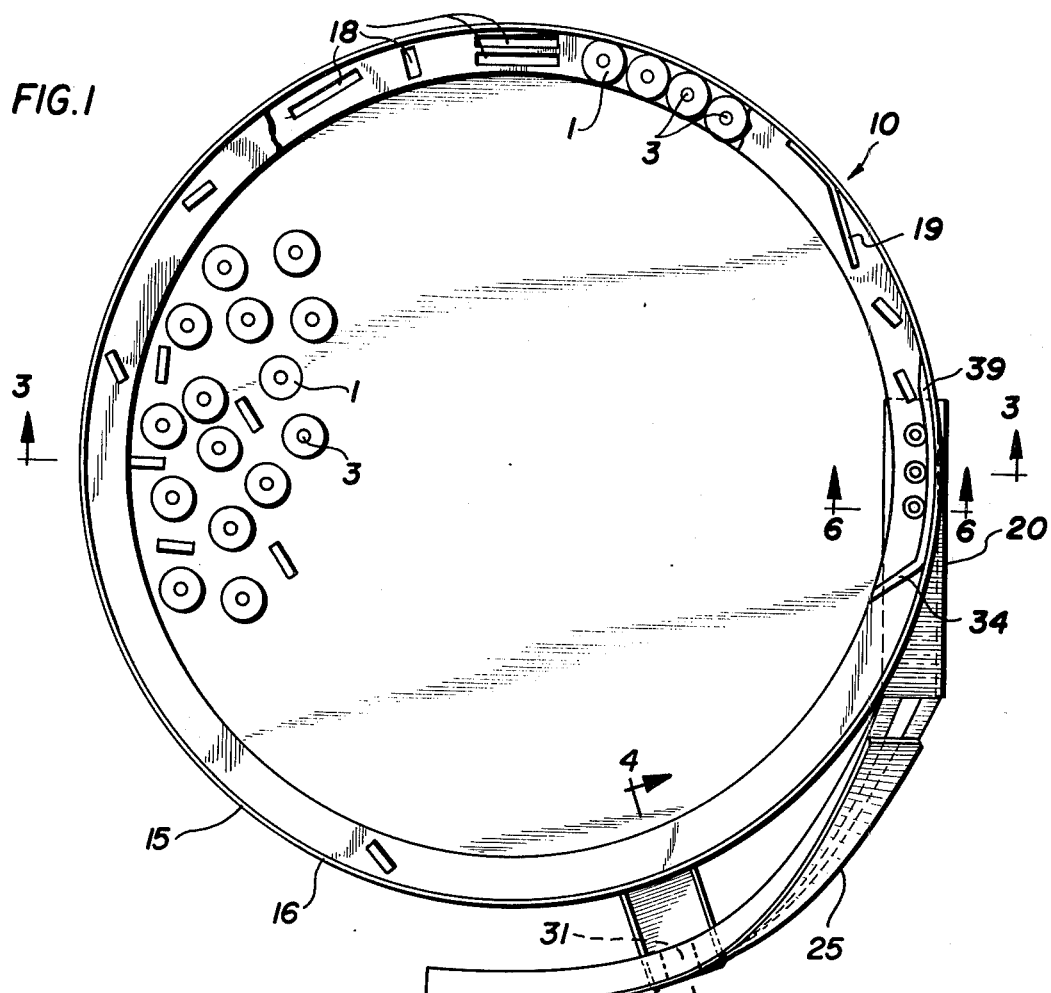
FIG. 1 is a top view of the preferred embodiment single bowl feeder.
Figure 3:
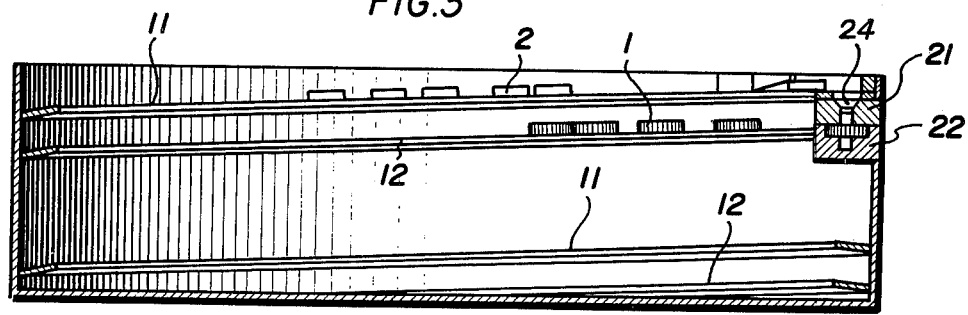
FIG. 3 is a transverse sectional view of the feeder shown in FIG. 1 taken along section line 3—3 of FIG. 1.

Turning now to FIG. 1, it will be seen that a double track feeder 10 is employed which has a pin track 11 and a blank track 12. As shown in FIG. 3, the pin track 11 is positioned, particularly at the discharge portion, above the blank track 12. In both instances there is a slight negative pitch to the tracks 11,12, so that the respective blanks 1 and pins 2 are confined for orientation along the tracks, and for subsequent delivery out of the bowl 15 and confined by the bowl wall 16, until delivered to the assembly block 20. The profile drops 18 shown at the 12 o'clock position of FIG. 1 are to permit pins which inadvertently find themselves on the blank track 12 to drop off and recirculate within the bowl 15 for recycling. A blank wiper 19 is provided at the upper portion of the blank track 12 to wipe off any blanks which may piggy-back atop each other, or be misoriented in a vertical axis. The blanks 1 and pins 2 both enter the assembly block 20, the same having a pin portion 21, a blank portion 22, and a chamfered pin hole 24 as shown in the upper right hand portion if FIG. 3.

Figure 2:
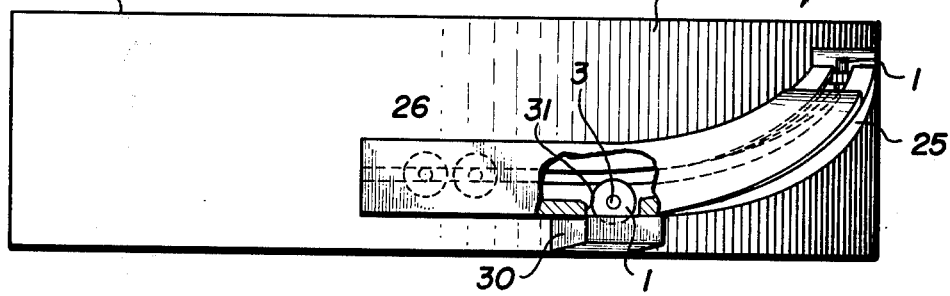
FIG. 2 is a front elevation of the feeder shown in FIG. 1 taken from the 6 o'clock position of FIG. 1.

After the pins 2 and the blanks 1 are assembled in oriented relationship, as will be described in detail hereinafter, they progress to the discharge track 25 as shown in FIGS. 1 and 2. A track cover 26 is placed atop the discharge track 25 at a position in spaced relationship to the assembly block 20 so that chips, dirt, and the like can be blown out of the track 25 and assembly block 20 during cleaning, and also the assembly can be observed. The discharge track 25 is curved as shown particularly in FIG. 2 until the track cover 26 is in substantially a vertical configuration. As will be seen, those blocks 1 (see FIG. 2) which do not contain a pin 2, drop through the blank escapement 31 within the track 25, and onto the recycle chute 30 which carries the blanks 1 back into the bowl 15 for recycling. The recycle chute 30 is provided with an opening 32 (see FIG. 4) whereby the blanks 1 pass directly back into the bowl 15 as described.

In greater detail, the recycle chute 30 and its operation will be seen in FIG. 4. The discharge track 25 at this position is in a substantially vertical orientation with the track cover 26 at the outside. Interiorly it will be observed that there are opposed pin rails 29, flanking the blank slot 28. In the view shown in FIG. 4, it is immediately adjacent the blank escapement 31 which is in effect an opening in the bottom of the blank slot 28 so that the lower portion thereof would not appear as shown in reverse cross hatching in FIG. 4. Thus, those blanks 1 into which a pin 2 is assembled, will ride over the blank escapement 31 since the ends of the pins will be confined in the pin rails 29. Alternatively, those blanks 1 which do not contain a pin 2 in the bore 3, will drop through the blank escapement 31 since they are supported only at the lower portion of the blank slot 28, and not by means of the pin 2 and its confined relationship within the pin rails 29.

The function and operation of the assembly block 20 appears more fully illustrated in FIG. 6. There it will be seen that the assembly block 20 contains the upper pin portion 21 and the lower blank portion 22. The same define, by means of the pin return opening 35, a pin support ledge 36, and blank support ledges 38. An alignment plow 39 at the inner portion of the pin track 11, delivers the pins more closely oriented above the chamfered pin hole 24 into which the pins drop for positioning in the blanks. Those pins which are not recycled by means of the pin return wall 34 (see FIG. 5) will find themselves between various blanks within the chamfered pin hole 24. As succeeding blanks 1 press into position, those pins 2 which are not assembled within the bore 3 of a blank 1 will drop through the pin return opening 35, and be recycled on the pin track 11 therebeneath, or fall into the bowl 15 for recycling. On the other hand, those pins which are loosely fitted within a blank are supported by means of the pin support ledge 36 until the assembled pin and blank unit is delivered to the discharge track 25 as shown in the upper right hand corner of FIG. 2. Also to be noted in FIG. 5 is the angular sector shown by the arrows and the reference numeral 39 which sets forth the approximate sector of the bowl wall 16 against which the alignment plow 39 is positioned.

In both FIGS. 5 and 6, there is an illustration of a pin press station 40 which can be employed in those instances where the pin 2 is to be press fitted within the bore 3 of the blank 1. Understandably, a slight taper on both ends of the pins 2 is desirable. The pin press station 40 includes a drive 44 which is actuated by means of the air sensor 45 coupled with the sensor jet 46 which, when it detects a blank 1 in position, as shown in FIG. 7, will actuate the blade 41 downwardly to press the pin 2 into the blank 1. The entire pin press station 40 is secured to the side wall 16 of the double track feeder 10 by means of the support 42 as shown. The utilization of a blade 41 having some radial distance permits the freedom of positioning of the pin 2 within very loose tolerances, and further the blade 41 is narrower than the pin, and the chamfered pin hole 24, so that when it is depressed, the relationship is akin to that of an axe finding a tree stump, rather than a hammer finding a nail.

ALTERNATIVE EMBODIMENT

An alternative embodiment of the subject feeder is shown in FIGS. 8 and 9. There it will be seen that two vibratory feeder bowls 51 and 52 are positioned side by side in a substantially tangential relationship of their sidewalls 16. The spaced relationship is dictated by means of the assembly block 20. In connection with the description of the alternative embodiment, the same reference numerals will be used as in connection with the preferred embodiment where the parts are common. It will be seen that in this instance the pin track 11 is positioned within the right hand bowl 52 which feeds the pins 2, and the blank track 12 is positioned within the left hand bowl 51 which feeds the blanks 1. The thus defined double bowl embodiment 50 delivers the pins 2 in a position (see FIG. 9) above the delivery of the blanks 1. To be observed in both FIGS. 8 and 9 is the pin recycle tray 55 which is coupled in open communication with the pin return opening 35 beneath the assembly block 20, and the pin bowl 52. In the same fashion as with the preferred embodient, those pins which drop through the pin return opening 35 are carried by the pin recycle tray 55 back into the pin feeder bowl 52.

At the upper portion of FIG. 9, as well as FIG. 8, it will be seen that the pins 2 are fed by means of a pin transfer tray 56 from the pin track 11 to a position above the assembly block 20 for vibratorily directing the same into the chamfered hole 24, particularly as shown in FIG. 9. The pins which do not drop into the chamfered hole 24 are returned by means of the recycle portion 58 of the pin transfer tray 56, as distinguished from the feed portion 57 of the pin transfer tray 56 which delivers the pins for positioning above the chamfered holes 24. As noted in FIG. 9, the feed portion 57 is inclined downwardly to the position immediately above the chamfered hole 24, whereas the recycle portion 58 inclines even further downwardly below the entrance to the chamfered hole 24 and for a return of the recycled pin into the pin feeder bowl 52 and thereafter onto the pin feeder track 11.

THE METHOD

The method of the invention is directed primarily to the insertion of a pin into a blank, the blank having a bore which will permit the pin to loose fit, or to enter partially for a press fit. In accordance with the method, the blanks and pins are to be fed to a common area, with the pins being discharged above the blanks. At the time of discharge the pins must be in a vertical axis, whereas the blanks must be in a horizontal plane. Thereafter, the pins which do not fall within the blanks are recycled by its feeding means, and the blanks which do not have pins are subsequently recycled. The method of recycling contemplates rotating the blanks to a configuration where the bore is substantially horizontal. Thus, when the pin is inserted, there is a wheel and axle relationship between the blanks and pins. The pins are, therefore, supported by opposed means which rollingly permit the pins to hold the blanks. Thereafter, the blanks are passed over an escapement which is slightly wider and longer than the blank, so that those blanks which do not have a pin supporting the same in axle-like fashion will drop through the escapement. Desirably the escapement is in open communication with the feeding mechanism so that the blanks which drop through the escapement will be returned for recycling. Similarly, it is desirable that those pins which do not find their way into a blank are also confined in open communication with the pin feeding means for recycling.

Although particular embodiments of the invention have been shown and described in full here, there is no intention to thereby limit the invention to the details of such embodiments. On the contrary, the invention is to cover all modifications, alternatives, embodiments, usages and equivalents of an apparatus for pin insertion and method as fall within the spirit and scope of the invention, specification and the appended claims.

What is claimed is:

1. Feeding and assembling mechanism for blanks having a bore and a pin for insertion into the bore comprising, in combination,
   a pin feeder track,
   a blank feeder track,
   means for advancing pins and blanks along their respective tracks,
   an assembly block connected to the terminus of the pin track and the blank track positioned and oriented to receive the pins above the blanks,
   a chamfered pin hole in said assembly block having a vertical axis to drop pins confined in a vertical axis,
   blank support means confining the blanks in a horizontal plane centered beneath the pin hole,
   a discharge track for receiving the blanks and pins therein,
   said discharge track confining and rotating the pins and blanks substantially ninety degrees,
   opposed pin rails for supporting assembled pins and blanks by the pin ends to deliver the same to the end of the discharge track,
   and recycle chute in a lower portion of the discharge track where the pin is oriented horizontally,
   whereby blanks without an assembled pin will fall through the recycle chute.

2. In the mechanism of claim 1,
   said recycle chute being beneath an escapement opening in the discharge track and connected to the blank feeder,
   whereby blanks without assembled pins are returned to the blank feeder for recycling.

3. In the mechanism of claim 1,
   pin return means defined by an opening in the lower portion of the assembly block,
   whereby pins not oriented in blank bores are returned to the pin feeder for recycling.

4. In the mechanism of claim 1,
   pin return means defined by an opening in the lower portion of the assembly block and in open communication with the pin feeder,
   whereby pins not oriented in blank bores are returned to the pin feeder for recycling.

5. In the mechanism of claim 2,
   said pin return means defined by an opening in the lower portion of the assembly block being in open communication with the pin feeder,
   whereby pins not oriented in blank bores are returned to the pin feeder for recycling.

6. In the mechanism of claim 1,
   a single vibratory feeder bowl having a blank track and a pin track with the pin track above the blank track with both tracks connected to the assembly block,
   whereby all parts are oriented or recycled by one bowl.

7. In the mechanism of claim 1,
   a pair of vibratory feeders with bowls oriented substantially tangentially,
   one feeder a pin feeder,
   one feeder a blank feeder,
   means orienting the pin feeder track at its discharge above the blank feeder track.

8. In the mechanism of claim 6,
   a recycle chute beneath the escapement opening and connected to the blank feeder,
   whereby blanks without assembled pins are returned to the blank feeder for recycling.

9. In the mechanism of claim 6,
   pin return means defined by an opening in the lower portion of the assembly block,
   whereby pins not oriented in blank bores are returned to the pin feeder for recycling.

10. In the mechanism of claim 6,
    pin return means defined by an opening in the lower portion of the assembly block in open communication with the pin feeder,
    whereby pins not oriented in blank bores are returned to the pin feeder for recycling.

11. The method of inserting a pin into a blank having a bore while feeding the blank and pin from separate blank and pin feeding means comprising the steps of:
    discharging the pins above the blanks,
    directing the blank horizontally to present its bore in a vertical orientation,
    confining the pins as fed in a vertical orientation above the blanks,
    recycling the pins which do not find a blank bore into the pin feeding means,
    rotating the blanks approximately 90° to a position where the bore is substantially horizontal to present an axle-like relationship of pin to blank,
    supporting and confining the ends of the axle-like pin,
    passing the blanks over an escapement slightly wider than the blank, thereby dropping those blanks not having a pin and passing the blanks having pins supported at their ends and recycling the blanks which drop through the trap back into the blank feeder.

* * * * *